United States Patent

Kimmet

(10) Patent No.: US 6,573,839 B2
(45) Date of Patent: Jun. 3, 2003

(54) AIRCRAFT CATASTROPHIC SECURITY SYSTEM

(76) Inventor: Stephen G. Kimmet, 118 Gross St., Tiffin, OH (US) 44883

( * ) Notice: Subject to any disclaimer, the term of this patent is extended or adjusted under 35 U.S.C. 154(b) by 15 days.

(21) Appl. No.: 10/002,660

(22) Filed: Oct. 23, 2001

(65) Prior Publication Data

US 2003/0058135 A1 Mar. 27, 2003

Related U.S. Application Data

(60) Provisional application No. 60/324,706, filed on Sep. 25, 2001.

(51) Int. Cl.[7] ............................................. G08B 21/00
(52) U.S. Cl. ...................... 340/945; 340/506; 340/531; 340/539; 340/825.72; 340/825.36; 701/14; 701/29; 701/35
(58) Field of Search ................................ 340/945, 531, 340/539, 506, 825.72, 825.36; 701/14, 29, 35

(56) References Cited

U.S. PATENT DOCUMENTS

| | | | | |
|---|---|---|---|---|
| 4,706,091 A | * | 11/1987 | Scott ........................... 340/945 |
| 5,144,661 A | * | 9/1992 | Shamosh et al. ............ 340/540 |
| 5,438,610 A | * | 8/1995 | Bhagat et al. ......... 340/825.44 |
| 5,974,349 A | * | 10/1999 | Levine ........................ 340/945 |
| 6,246,320 B1 | * | 6/2001 | Monroe ....................... 340/506 |
| 6,385,513 B1 | * | 5/2002 | Murray et al. .............. 340/945 |

* cited by examiner

Primary Examiner—Daniel J. Wu
Assistant Examiner—Hung Nguyen

(57) ABSTRACT

An aircraft catastrophic security system is provided to prevent terrorists and major aircraft equipment failures from causing major catastrophic results in the air or on the ground. The system employs on-board aircraft danger signal personnel and devices to generate danger signals, a complex code scheme to assure security of signals, on-board aircraft processing devices to sense the danger signals, to place the aircraft into a controlled, restricted state, to signal external processing devices and authorized personnel of the dangerous on-board aircraft conditions, and to inform national and local authorities of the aircraft's condition. Even without danger signals from the aircraft, the external authorized personnel may deem to take over control of the aircraft. In either case, by way of an on-board aircraft control device, the aircraft catastrophic security system also remotely, controllably operates the aircraft from the external processing device, so as to enforce safe disposition of the aircraft.

2 Claims, 1 Drawing Sheet

AIRCRAFT CATASTROPHIC SECURITY SYSTEM

RELATED APPLICATIONS

The application claims the benefit of U.S. Provisional Patent Application Ser. No. 60/324,706, filed Sep. 25, 2001.

BACKGROUND OF THE INVENTION

The present invention relates to an aircraft catastrophic security system, wherein ways are provided to generate aircraft danger signals, to sense the aircraft danger signals, to place an aircraft into a controlled, restricted state, to signal externally any dangerous aircraft conditions and the control state of the aircraft, to inform national and local authorities of the aircraft's condition, to remotely, controllably operate the aircraft, and to enforce safe disposition of the aircraft.

More particularly, the present invention deals with an aircraft catastrophic security system that allows danger signal personnel and on-board aircraft equipment to signal danger in an aircraft by use of danger signal devices, wherein an on-board aircraft processing device monitors for such signals and, if received, the on-board aircraft processing device signals an on-board aircraft control device to place the aircraft into a controlled, restricted state and then the on-board aircraft processing device communicates this dangerous condition and the state of the aircraft control to authorized external processing devices and personnel, or in special cases the external authorized personnel can take control of an aircraft that may be having problems without the aircraft's knowledge, in either case the external processing device and authorized personnel can remotely control aircraft by way of the on-board aircraft control device, so as to enforce the safe disposition of the aircraft.

Most particularly, the present invention deals with an aircraft catastrophic security system that comprises an on-board aircraft processing device that can transmit danger signals that are generated by on-board authorized danger signal personnel and devices. On board danger signal personnel include flight attendants, plain clothes security officers, pilots, and others. These personnel use danger signal devices like small personal beeper devices, phones, and devices placed in on-board consoles, or in the flight cockpit. The act of signaling a dangerous condition may involve a special code and special procedure, so that nuisance signaling of the system could be avoided. An on-board aircraft processing device monitors for danger signals and if it receives a danger signal, then the on-board aircraft processing device signals an on-board aircraft control device, or if external authorized personnel sense a danger on the aircraft, the external processing device signals an on-board aircraft control device, that places the aircraft into a controlled, restricted operating state, where the state may allow only minor adjustment to the aircraft controls or the state may be as simple as forcing the aircraft to stay at a certain altitude until the danger signal has been analyzed. In either state, the on-board aircraft processing device automatically transmits to the external processing device and authorized external personnel the existence and details associated with the aircraft's dangerous condition, and national and local authorities would be communicated the conditions on the aircraft. In addition, external authorized personnel would communicate through verbal and/or electronic control methods of communications with the aircraft crew, on-board security personnel, aircraft environmental conditions, and aircraft operating signals to decide on the proper state that the aircraft controls should be place therein, and, subsequently, enforce where and when the aircraft would be safely disposed. Existing airports may be used or new airfields may be built as part of the present invention, in order to safely return the aircraft, passengers, crew, and cargo to the ground and to safely protect the life and property below a flying aircraft. If new airfields are used they may be built across a nation, and elsewhere, in a location that is lightly populated and is remote from strategic sites. All flights of aircraft that experienced the generation of a danger signal could be forced to land under external authorized control, even if the danger signal was a false alarm signal.

Currently, hijackers are taking over aircraft and personally flying the aircraft as bombs into buildings. This results in enormous loss of life, disruption of government, and loss of property. Typically, the hijackers will physically harm crew members and then take full control of the aircraft, because there is no instrument control function to stop them from immediately taking over from the pilot and co-pilot. In addition, if an aircraft experiences a major equipment malfunction, the results can be just as catastrophic. Some of the sources of major aircraft equipment problems can be the result of the malfunction of the equipment, improper maintenance, environmental conditions, improper handling of the aircraft, hijacking of the aircraft, and an explosion on-board the aircraft. If terrorists get control of the aircraft they can virtually fly the aircraft where they desire, while national defenses may need to shoot the plane down, which can have catastrophic results on the ground as well. There also are cases where an aircraft may not be functioning properly or may not be flying properly and the conditions are not obvious on-board the aircraft. In some of these cases communications with the aircraft are not good and external control cannot be gained, but the consequences of such flight may also be catastrophic.

SUMMARY OF THE INVENTION

To solve the aforementioned problems, the present invention provides a system that will counteract the sources of dangerous aircraft problems. The present invention allows, among others, the crew, on-board security personnel, and various aircraft control functions to signal that a dangerous condition exists. The on-board aircraft processing device continuously senses these signals, identifies the source of the signal, may alert the crew, alerts external processing devices and external authorized personnel, and places the aircraft into a controlled, restricted state. Upon receiving the dangerous condition signal, the external authorized personnel make plans to determine the source of the problem, the aircraft's location, heading, elevation, possible planned destinations, and its potential impact on life, government, and property. In special cases where an aircraft is not aware of its improper functioning or flying pattern or the aircraft cannot be communicated with, then the external authorized personnel may decide to take control of the aircraft. At that point, if it is possible and desired, external processing devices and authorized personnel may communicate with aircraft crew members to determine the conditions that the aircraft crew is operating under and to get their input on the dangerous condition's source and to determine what, if any, limited control that might be returned to the aircraft. If conditions warrant, the external authorized personnel then determine where and when the aircraft will be safely disposed. Following the receipt of the dangerous signal from the aircraft the on-board aircraft processing device would inform national and local authorities of the conditions, so as to help in properly and safely handling the disposition of the aircraft.

Various objects and advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
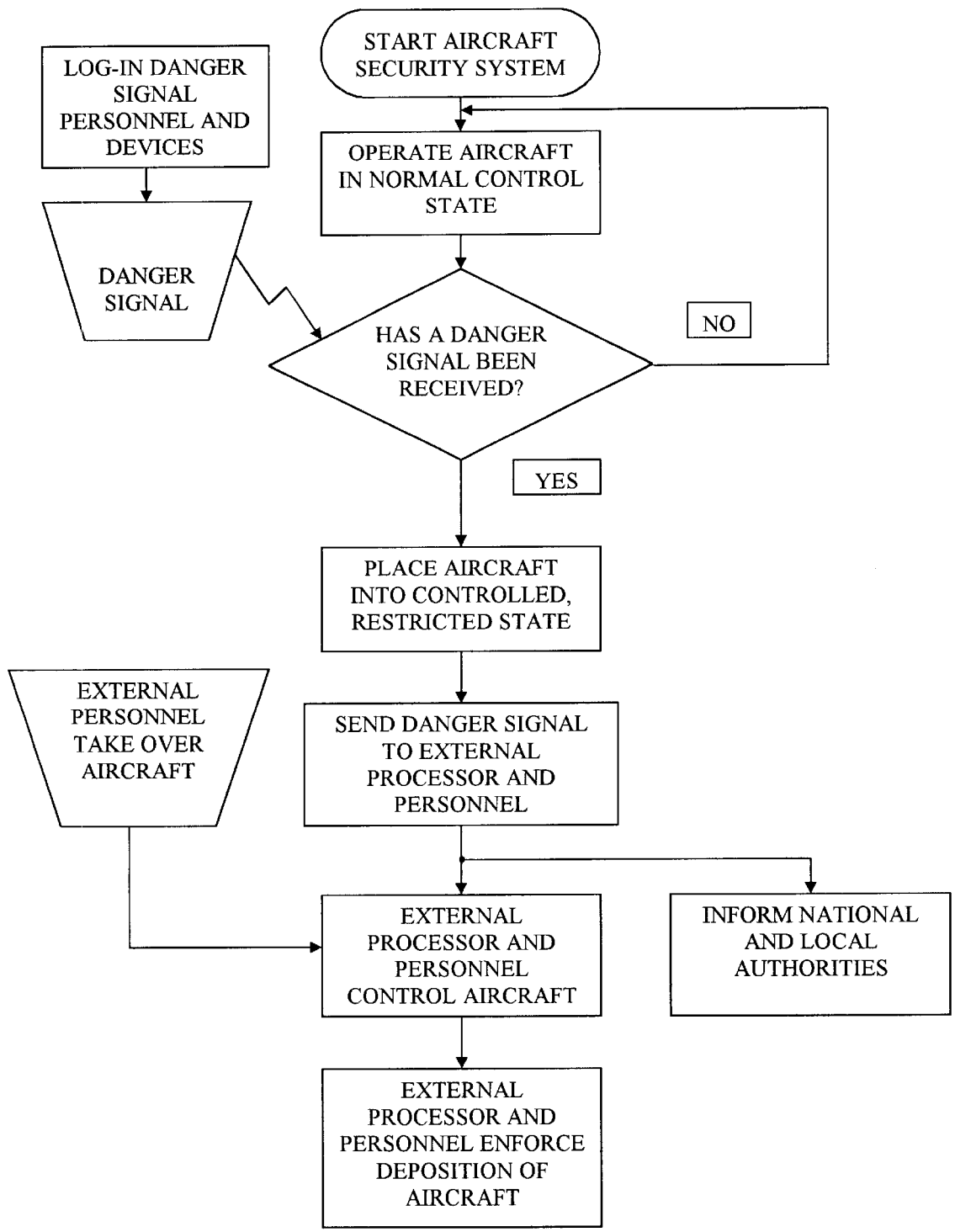
FIG. 1 is a flow chart of the logic that the aircraft catastrophic security system operates under.

Referring to FIG. 1, there is illustrated an aircraft catastrophic security system flow chart of the process that embodies the invention. The aircraft catastrophic security system monitors and controls the operating state that the aircraft is working under, at any given point in time. Initially, the aircraft is set to be operated in a normal state. If, however, the aircraft has been placed into a controlled, restricted operating state, then merely powering the aircraft down, and then back up, will not allow a controlled, restricted state condition to be set back to the normal state. The controlled, restricted operating state will be retained in the aircraft catastrophic security system even upon a total aircraft electrical and engine power down. Under the controlled, restricted operating state, only a control signal directed by external authorized personnel can clear the controlled, restricted state or return limited control to the aircraft.

To start off the process, an aircraft is placed into the normal state of operation, where the aircraft will be allowed to be controlled by on-board personnel, in much the same manner that it would be controlled, if it did not use this system.

Authorized on-board, danger signal personnel might be flight attendants, plain clothes security officers, pilots, and others. Security officers would not necessarily be known by the crew of the aircraft and the security officers would not necessarily be highly trained but could act only as observers of dangerous situations. As the crew and security personnel board the aircraft they would sign-in to an on-board aircraft processing device, so that the system would be aware of which danger signal personnel were onboard. The personnel capable of signaling danger on-board could sign-in through a danger signal device, like a beeper, cell phone, or other wired or wireless device.

Beyond the human means to present a danger signal, certain aircraft functions would be designated as critical and sensors would communicate dangerous conditions as well. Examples of this might be landing gear failures, hydraulic failures, electrical failures, mechanical failures, air pressure, and oxygen failures.

Danger signal personnel codes, like passwords and answers to personal questions that only the specific danger signal personnel would know would be an important part of the aircraft catastrophic security system, so that secure usage of the danger signal devices would be accomplished. There would be many danger signal personnel and each would have danger signal device codes, like passwords and questions that only the individual danger signal personnel would know. Danger signal devices would be able to verify these passwords and answers and would pass this information on to the on-board aircraft processing device and the external processing device in a complex code scheme, where requests would be made from the on-board aircraft processing device and the external processing device in a totally random manner so that there would be enormous unpredictability associated with the request for the codes, like passwords and answers to the personal questions. These precautionary precautions would be prevalent in all danger signal input functions in the system, especially after a danger signal would be actuated and the external authorized personnel would be verifying subsequent conditions in the aircraft. If any of the danger signal personnel that the aircraft catastrophic security system knows to be on-board, does not properly respond to the external authorized personnel after a danger signal has been transmitted, then the aircraft catastrophic security system suspects the highest form of danger and acts appropriately thereafter.

Also, as part of the complex code scheme, the danger signal personnel, who are the only ones to know the answers to requests for passwords and the questions being asked, would be required to use great memorization for many possible codes and answers. Much training would be required of the danger signal personnel, to develop their own unique passwords, possibly founded on mathematics, culture, language, and other unpredictable circumstances. In the complex code scheme, answers to questions that danger signal personnel would only have knowledge of would be used in such a way that any hijacker would not easily be able to get those passwords and answers and would have to patiently spend great amounts of time during the flight, in an attempt to obtain the codes. By having the possibility of unknown security personnel on board, a hijacker would not easily know who might have the ability of causing the aircraft to be placed into a dangerous signal state. One of the possible danger signal devices might be a commotion sensor that would pick up extreme emotional signals from the passengers and crew. It is also possible that many passengers, who have reputable and trustworthy backgrounds, could be trained to input danger signals so that hijackers would need to contend with countless and unpredictable possibilities. This would help to build and maintain the public confidence in the aircraft system in a country. Pilots and crew members would be given the quickest and easiest means to signal danger. They would be the best trained in the passwords and questions that they only know the answers to.

Depending on the circumstances, feedback to the crew of the status of danger signals may or may not be relayed or may be modified as it would be deemed necessary. An on-board aircraft control device is required for controllably operating the aircraft, where the external authorized personnel, by use of the external processing device, would completely fly the aircraft, or it might be used in a wait-and-see mode, where full control is left in the hands of the cockpit, or the aircraft could operate somewhere in between these possibilities. Cameras on-board the aircraft may be used to determine if hijacking is taking place, where the video and audio is transmitted to the external authorized personnel. The door to the cockpit and doors on compartments where the crew could be housed may need to be locked and highly protected against general entry and bullet attack. The status of these doors, like open, closed, broken, and ajar would be signals that external authorized personnel would be knowledgeable of in the aircraft catastrophic security system, by way of the external processing device.

If an aircraft is placed into a controlled, restricted state, the state may be to allow only minor adjustment to the aircraft controls or the state may be as simple as forcing the aircraft to stay at a certain altitude until the danger signal has been analyzed. However, before significant control is returned to the aircraft, following a danger signal, all onboard danger signal personnel must be in contact with external authorized personnel. No matter what state of control that is returned to the aircraft, an aircraft that has received even just one accidental danger signal could be dealt with seriously and control should not be fully returned to the aircraft, and the aircraft should not be allowed to get near predetermined high risk sites. As far as destinations for landing an aircraft that has had a danger signal alarm, the landing should be guarded as though the worst scenario would happen. New landing strips could be built across a nation, so as to land those flights that have experienced a danger signal alarm. These landing strips do not have to be full airports and could be located in less populated areas with fewer people, with no strategic sites, and have less property to be damaged.

If, at any time, the external authorized personnel feel that it is necessary to control an aircraft, they do not need a danger signal from on-board personnel or equipment to place the aircraft into a controlled, restricted state. This can be done if the necessity should arise.

If an aircraft is not placed in a controlled, restricted state throughout its flight, then the flight is not impeded and danger signal personnel and equipment must report a successful completion of the flight. If, however, for any reason an aircraft is placed in a controlled, restricted state, then all danger signal personnel and equipment must be returned to a safe state or the aircraft remains in the controlled, restricted state.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An aircraft catastrophic security system comprising:
   a) at least one on-board aircraft danger signal device transmitting a plurality of danger signals and receiving and transmitting a plurality of danger signal personnel codes and receiving and transmitting a plurality of danger signal device codes;
   b) an on-board aircraft control device controllably operating an aircraft and being controlled externally, remotely for controllably operating said aircraft;
   c) an on-board aircraft processing device receiving said danger signals from a plurality of danger signal devices and receiving and transmitting said danger signal personnel codes from and to a plurality of danger signal personnel and transmitting and receiving said danger signal device codes from and to said plurality of danger signal devices and transmitting and receiving on-board control state conditions information and operating said on-board aircraft control device and transmitting said on-board control state conditions information to national and local authorities; and
   d) an external processing device transmitting and receiving said on-board aircraft control state conditions information to and from said plurality of on-board aircraft processing devices and transmitting and receiving said on-board aircraft control state conditions information to and from said plurality of on-board aircraft control devices and transmitting and receiving a plurality of aircraft operating commands to and from said plurality of on-board aircraft processing devices and transmitting and receiving on-board aircraft operating commands to and from said plurality of on-board aircraft control devices.

2. A method of operating an aircraft catastrophic security system comprising the steps of:
   a) placing an aircraft into normal operating mode by an external processing device;
   b) logging danger signal personnel on-board of said aircraft, through the use of danger signal personnel codes, by an on-board aircraft processing device;
   c) logging on-board danger signal devices of said aircraft, through the use of danger signal device codes, by said on-board aircraft processing device;
   d) monitoring danger signals of said aircraft by said on-board aircraft processing device;
   e) placing on-board aircraft control device in a controlled, restricted operating mode upon receipt of said danger signal by said on-board aircraft processing device;
   f) transmitting said danger signal to said external processing device by said on-board aircraft processing device;
   g) informing national and local authorities of said danger signal by said on-board aircraft processing device;
   h) controlling said on-board aircraft control device by said external processing device; and
   i) disposing of said aircraft by said external processing device.

* * * * *